No. 845,739. PATENTED MAR. 5, 1907.
L. A. ALSON.
DISPLAY RACK.
APPLICATION FILED APR. 30, 1906.
2 SHEETS—SHEET 1.
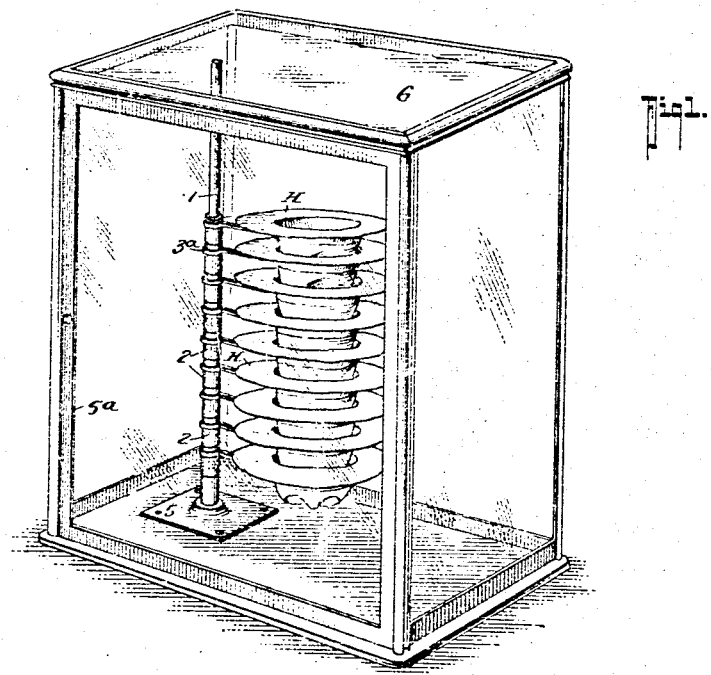
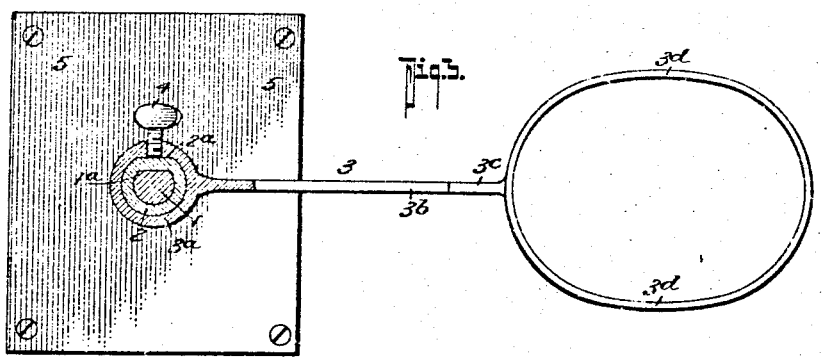
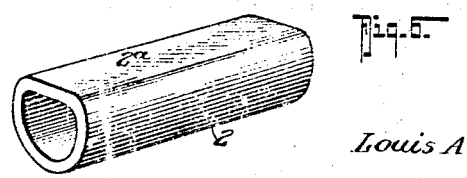
WITNESSES:
John T. Schrott
F. C. Gibson
INVENTOR
Louis A. Alson.
BY
Fred G. Dieterich
ATTORNEYS

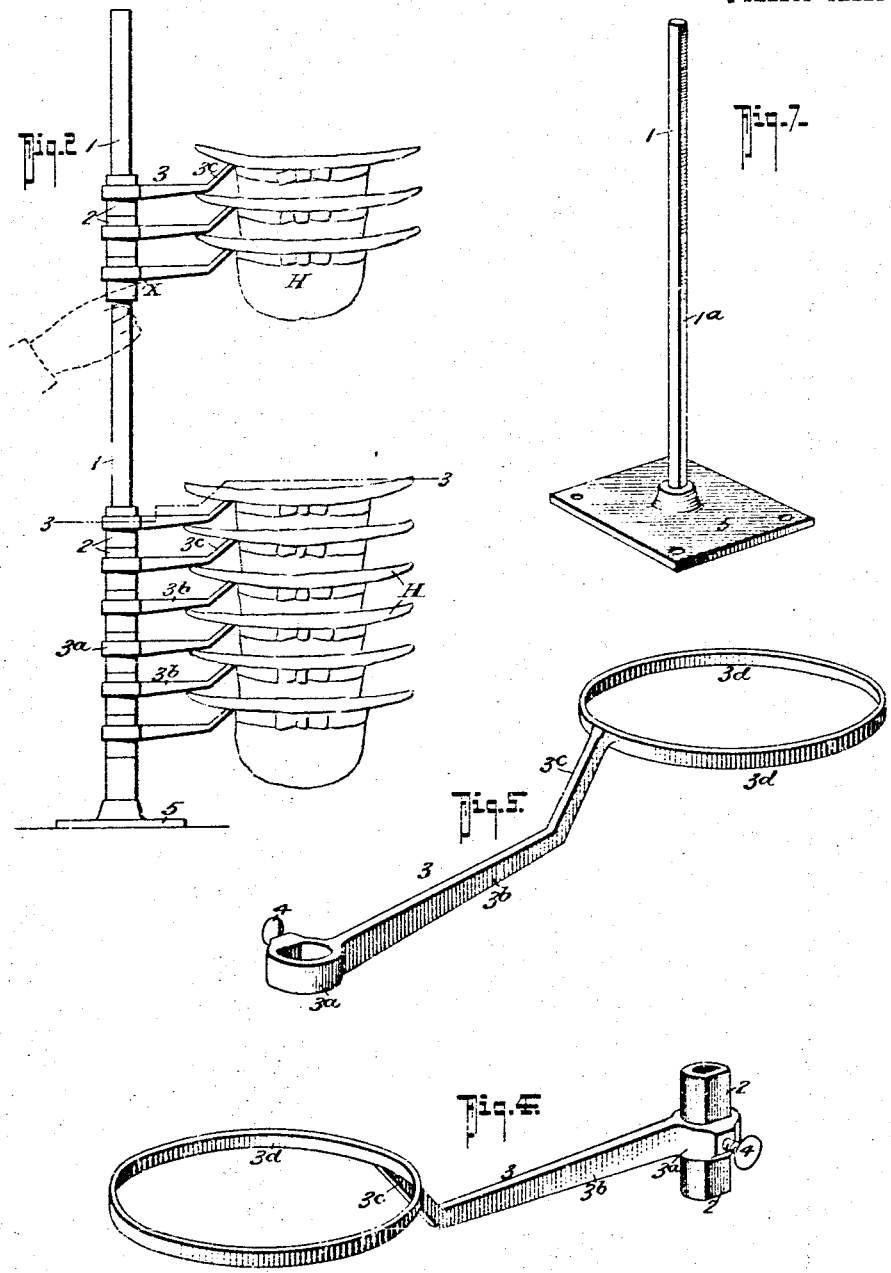

UNITED STATES PATENT OFFICE.

LOUIS ANTHONY ALSON, OF WATERVALLEY, MISSISSIPPI.

DISPLAY-RACK.

No. 845,739.　　　Specification of Letters Patent.　　　Patented March 5, 1907.

Application filed April 30, 1906. Serial No. 314,382.

*To all whom it may concern:*

Be it known that I, LOUIS ANTHONY ALSON, residing at Watervalley, in the county of Yalobusha and State of Mississippi, have invented certain new and useful Improvements in Display-Racks, of which the following is a specification.

My invention relates to certain new and useful improvements in display-racks; and it more particularly seeks to provide a display-rack for hats and the like of a very simple and economical construction, which can be easily and cheaply manufactured, and which will readily and effectively serve its intended purposes.

Generically my invention comprises a base from which a rod or post projects upwardly, a plurality of sleeves slidably mounted on said rod, and a plurality of arms detachably secured one on each sleeve, which arms have portions to receive the hat, the rod and the sleeves having coöperating means to prevent turning of the latter, and a casing for the rack wherein the parts can be held substantially dust-proof.

In its more detailed nature my invention comprises certain novel construction, combination, and arrangement of parts, all of which will be first described in detail and then be specifically pointed out in the appended claims, reference being had to the accompanying drawings, in which—

Figure 1 is a perspective view showing my invention complete and in use. Fig. 2 is a side elevation of the rack removed from the casing and showing the parts separated to permit the removal of a hat. Fig. 3 is a cross-section on the line 3 3 of Fig. 2. Fig. 4 is a detail perspective view of one of the sleeves and its coöperating arm. Fig. 5 is a detail perspective view of the arm detached from the sleeve. Fig. 6 is a detail perspective view of the sleeve. Fig. 7 is a detail perspective view of the standard or supporting-base.

Referring now to the accompanying drawings, in which like letters and numerals indicate like parts in all of the figures, 1 designates a vertical post of substantially circular cross-section and having a flattened portion $1^a$ extending its full length, as shown. The post 1 is securely mounted to a suitable base or supporting-plate 5, which in turn is secured in the glass casing 6, in which the entire rack is adapted to be held to keep the hats free from dust. Held on the post 1 is a series of sleeves 2, each of which in practice is made about one and one-half inches long and formed with a flat portion $2^a$ to coöperate with the flat portion $1^a$ of the rod 1, the sleeves being so constructed as to fit snugly on the rod or post 1 without binding. Adjustably and removably secured to each sleeve 2 is an arm 3, consisting of a loop or eye portion $3^a$ to snugly fit around the sleeve 2, and the arm 3 is secured to the sleeve 2 by a set-screw 4, as shown. The arm 3 has a horizontally-projecting portion $3^b$ merging with an upwardly-extending portion $3^c$, which carries a horizontally-held loop $3^d$, in which the hat H is adapted to be set, crown downward, as shown in the drawings.

In the practical construction of my invention the post 1 will be made about four to six inches longer than the combined length of the sections 2 2, so that the arms 3 can be separated, as shown in Fig. 2, to permit removal of a hat.

By reason of the manner in which the arms 3 are secured to the sleeves 2 and by reason of the fact that the sleeves 2 snugly fit the rod 1 without binding, the sleeves, which normally rest abutting one another, may be separated, as shown in Fig. 2, to allow removal of the hat, the weight of the hat on the upper ones of the separated arms 3 being sufficient to cause the sleeves 2 to frictionally hold themselves on the rod 1, as will be clearly understood by those skilled in the art to which this invention relates.

The housing 6, which is in the nature of a glass casing, may be provided with sliding doors $6^a$, so that ready access may be had to the interior of the casing.

By placing the finger of the operator under one of the arms 3 at the point X of Fig. 2 and pushing up thereon the hats may be divided at any part of the sections desired and separated, as shown in Fig. 2, so that the hat can be removed. Normally the sections 2 2 are in engagement with one another, and the crowns of adjacent hats are projected into one another, as indicated in Fig. 1, so that they will take up the minimum amount of space.

From the foregoing description, taken in connection with the accompanying drawings, it is thought that the complete construction, operation, and arrangement of parts will be readily understood by those skilled in the art to which the invention appertains.

What I claim is—

1. A rack comprising a base, a rod projecting upwardly therefrom, a series of tubular sleeves freely slidable on the rod, said rod and said sleeves having means to prevent turning of the sleeves on the rod, arms removably mounted on said sleeves and movable therewith and terminating in hat-receiving loops substantially as shown and described.

2. A rack comprising a base, a rod projecting upwardly therefrom, a series of tubular sleeves slidably mounted on the rod, said sleeves and said rod having coöperating flattened portions, an arm for each sleeve, said arms each having a hat-receiving loop at one end and a loop or eye portion at the other end to receive one of said sleeves, means for locking each arm on its sleeve, all being arranged substantially as shown and described.

3. A rack comprising a base, a rod projecting upwardly therefrom, a series of tubular sleeves slidably mounted on the rod, said sleeves and said rod having coöperating flattened portions, an arm for each sleeve, said arms each having a hat-receiving loop at one end and a loop or eye portion at the other end to receive one of said sleeves, means for locking each arm on its sleeve, each arm having its sleeve-receiving loop provided with a flattened portion to coöperate with the flattened portion of its sleeve, substantially as shown and described.

LOUIS ANTHONY ALSON.

Witnesses:
W. T. DAWKINS, Jr.,
JAS. K. FULSON.